United States Patent [19]

Cho

[11] Patent Number: 5,009,673
[45] Date of Patent: Apr. 23, 1991

[54] METHOD FOR MAKING POLYCRYSTALLINE SANDWICH COMPACTS

[75] Inventor: Hyun S. Cho, Sandy, Utah

[73] Assignee: The General Electric Company, Worthington, Ohio

[21] Appl. No.: 277,875

[22] Filed: Nov. 30, 1988

[51] Int. Cl.⁵ .............................................. B24D 18/00
[52] U.S. Cl. ........................................ 51/293; 51/307; 264/125
[58] Field of Search ............... 428/627, 698, 457, 408, 428/552; 51/307, 309, 293, 295; 25/238, 239, 240, 244; 419/6, 10; 264/125

[56] References Cited

U.S. PATENT DOCUMENTS

| | | | |
|---|---|---|---|
| 4,219,339 | 8/1980 | Wilson | 51/307 |
| 4,764,434 | 8/1988 | Aronsson et al. | 428/565 |
| 4,797,326 | 1/1989 | Csillag | 428/551 |
| 4,906,528 | 3/1990 | Cerceau | 428/552 |
| 4,907,377 | 3/1990 | Csillag et al. | 41/309 |
| 4,944,772 | 7/1990 | Cho | 51/293 |

Primary Examiner—Brooks H. Hunt
Assistant Examiner—Ngoclan T. Mai
Attorney, Agent, or Firm—Mueller and Smith

[57] ABSTRACT

Disclosed is a method for manufacturing a polycrystalline sandwich compact comprising a polycrystalline diamond or CBN core interposed between outer support layers. The method comprises providing an assembly comprising a mass of diamond or CBN particles, a pair of compression disks, and two metal layers, one of each of which is interposed between said mass and each said compression disk. When said mass comprises diamond particles, a source of sintering aid/catalyst for diamond sintering also is provided in the assembly and optionally for CBN particles a source of sintering aid/catalyst for CBN sintering is provided in said assembly. The assembly then is subjected to HP/HT sintering for forming a sintered polycrystalline diamond or CBN core having two metal-derived support layers adherently bound thereto.

13 Claims, 1 Drawing Sheet

METHOD FOR MAKING POLYCRYSTALLINE SANDWICH COMPACTS

BACKGROUND OF THE INVENTION

The present invention relates to polycrystalline diamond or cubic boron nitride (CBN) compacts made by a high pressure/high temperature process (HP/HT) and more particularly to such compacts in a sandwich configuration.

A compact is a sintered polycrystalline mass of abrasive particles (e.g. diamond) bonded together to form an integral, tough, coherent, high strength mass. A composite compact is a compact bonded to a substrate material, such as a cemented metal carbide (e.g. cobalt cemented tungsten carbide). The metal bonded carbide mass generally is selected from the group consisting of tungsten, titanium, tantalum carbides and mixtures thereof with metal bonding material therein normally being present in a quantity from about 6 to 25 weight percent and selected from the group consisting of cobalt, nickel, iron and mixtures thereof. Other metal carbides can be used.

Compacts or composite compacts may be used as blanks for cutting tools, drill bits, dressing tools, and wear parts. Compacts made in a cylindrical configuration have been used to make wire drawing dies (see U.S. Pat. No. 3,381,428).

One method for manufacturing diamond compacts involves the steps of:

A. placing within a protective shield metal enclosure which is disposed within the reaction cell of an HP/HT apparatus;
   (1) a mass of diamond crystals; and
   (2) a mass of catalyst metal or alloy containing catalyst metal in contact with the mass of diamond crystals; and
B. subjecting the contents of the cell to conditions of temperature, pressure and time (typically at least 50 kbar, at least 1300° C. and 3-120 minutes) sufficient to give bonding between adjacent crystal grains.

The mass of catalyst metal could be in the form of a disc of one of the well known catalysts or an alloy containing at least one catalyst metal for diamond crystallization. Under the HP/HT condition, a wave of liquid metal advances through the dense diamond (or CBN material as described below), and the catalyst metal (in liquid form) makes itself available as a catalyst or solvent for recrystallization or crystal intergrowth. The terms catalyst and catalyst/solvent are used interchangeably. This process is sometimes known as the sweep-through method, i.e. the catalyst sweeps (or advances or diffuses) through the crystalline mass.

The relative shapes of the abrasive mass and catalyst can be varied. For example, the mass of diamond can be cylindrical, and the catalyst can be an annular shape surrounding the cylinder of abrasive crystals or a disc on top or below the diamond mass.

The source of catalyst may also be cemented metal carbide or carbide molding powder (which may be cold pressed to shape) wherein the cementing agent is a catalyst or solvent for diamond recrystallization or growth.

The catalyst is generally selected from cobalt, nickel and iron, but can be selected from any of the known catalysts which also include ruthenium, rhodium, palladium, platinum, chromium, manganese, tantalum or mixtures or alloys of catalysts. Catalyst may be mixed with the abrasive crystals in addition to or instead of being a separate mass adjacent to the abrasive crystals.

High temperature and high pressure in the diamond stable region are applied for a time sufficient to bond or sinter the diamond crystals together. The diamond stable region is the range of pressure temperature conditions under which diamond is thermodynamically stable. On a pressure-temperature phase diagram, it is the high pressure side, above the equilibrium line between diamond and graphite. The resulting compact is characterized particularly by diamond-to-diamond bonding, i.e., bonding between adjacent grains whereby there are parts of the crystal lattice which are shared between neighboring crystal grains (resulting from recrystallization at HP/HT conditions). The diamond concentration preferably is at least 70 volume percent of the diamond mass (i.e. excluding any substrate mass). Methods for making diamond compacts are detailed in U.S. Pat. Nos. 3,141,746; 3,745,623; 3,609,818; 3,831,428; and 3,850,591 (all of which are incorporated herein by reference).

Cubic boron nitride compacts are manufactured in a similar manner to that just described for diamond. However, in making a CBN compact by the sweep-through method, the metal swept through into the CBN crystal mass may or may not be a catalyst or solvent for CBN recrystallization. Thus, a mass of polycrystalline CBN can be bonded to a cobalt cemented tungsten carbide substrate by sweep through of the cobalt ingredient into the interstices of the CBN mass under HP/HT conditions, even though cobalt is not a catalyst for CBN. This interstitial cobalt binds the polycrystalline CBN to the cemented tungsten carbide substrate. Nevertheless, the term catalyst will be used to describe the bonding or sintering metal swept into a CBN particle mass for the sake of convenience. In either the case of diamond or CBN composite compacts, the cobalt depletion of the substrate often, though not necessarily, is not enough to be detrimental to the support function of the substrate.

The HP/HT sintering process for CBN is carried out in the CBN stable region which is in the range of pressure and temperature conditions under which CBN is thermodynamically stable. CBN concentration is preferably at least 70 volume percent of the CBN mass. Methods for making CBN compacts are detailed in U.S. Pat. Nos. 3,233,988; 3,743,489; and 3,767,371, which are incorporated herein by reference. Crystal intergrowth or crystal-to-crystal bonding between neighboring CBN grains (as described for diamond compacts) is believed to be present.

Re-sintered polycrystalline CBN compacts, disclosed in U.S. Pat. No. 4,673,414, are made by sintering substantially catalyst-free boron-rich polycrystalline cubic boron nitride particles in an HP/HT apparatus. Particles are subjected to a pressure and temperature adequate to re-sinter the particles, the temperature being below the CBN re-conversion temperature. The pressure typically is in excess of about 45 Kbars and the temperature ranges from at least about 1500° C. to below the CBN reconversion temperature. Direct conversion CBN compacts, disclosed in U.S. Pat. No. 4,188,194 are made by placing preferentially oriented pyrolytic hexagonal boron nitride in a reaction cell. The boron nitride is substantially free of catalytically active materials and is subjected to a pressure of between about 50 and 100 Kbars and a temperature of at least 1800° C., and within the cubic boron nitride stable region of the boron nitride phase diagram.

The manufacture of thermally stable compacts is described in U.S. Pat. Nos. 4,228,248 and 4,224,380, (both of which are incorporated herein by reference). These patents teach the removal of substantially all of the metallic (catalyst) phase from compacts to yield a compact comprising self-bonded diamond or CBN particles with an interconnected network of pores dispersed throughout. Such compacts can withstand exposure to temperatures of about 1200° C. to 1300° C. without substantial thermal degradation, an advantage over the compacts of, for example, U.S. Pat. No. 3,745,623 which are thermally degraded at a temperature of between about 700° C. and 900° C. Thermal degradation is indicated by a marked loss (e.g. 50%) in physical properties, such as decreased abrasion resistance, tansverse rupture strength and modulus of elasticity with increasing temperatures. The metallic or catalyst phase is removed by acid treatment, liquid zinc extraction, electrolytic depletion or similar processes. The compacts of this type will be referred to throughout as thermally stable compacts.

Fine diamond feed material has always been more difficult to sinter by the sweep-through method. Generally, sintering becomes increasingly difficult as the feed material particle size decreases. Smaller sizes of diamond feed materials (particles having a nominal largest dimension of 4-8 microns or less) have been a problem for some time because of their large surface area and small size causes more difficulties when cleaning, handling or loading the fine powder into a reaction cell. However, it is also known that as the grain size of diamond compacts decreases, transverse rupture strength increases, thus giving compacts made with smaller particles an advantage. Another advantage is the compact's finer cutting edge which may result in less workpiece damage. Under the high pressures (e.g. 50 kbar and greater) applied during the HP/HT process, such fine abrasive crystals compact resulting in a rather high packing density and a very fine pore structure. The resulting diamond mass, therefore, is dense and offers resistance to the percolation or sweep of catalyst metal through the interstices.

Sandwich compacts comprise polycrystalline diamond or CBN sintered compacts which are interposed between two support layers such as a metal or metal alloy, or a cemented carbide substrate. Sandwich compacts have been proposed in U.S. Pat. Nos. 4,219,339; 4,229,186; and 4,255,165. These citations provide a variety of sandwich compact configurations. Regardless of the configuration, such sandwich compacts are difficult to reliably fabricate on an economical basis due to an inherent fracturing problem particularly at the diamond-substrate interface. Such fracturing problem is a major mode of failure under the HP/HT fabrication process or in a later brazing process. When finer diamond feed material is used, the fabrication of sandwich compacts is further exacerbated due to the difficulty in the catalyst sweeping through the interstices from the carbide support.

BROAD STATEMENT OF THE INVENTION

The present invention is directed particularly to an economic and reliable process for fabricating sandwich compacts. Such fabrication method comprises providing an assembly comprising a mass of diamond or CBN particles interposed between two metal layers at least one of which is a catalyst for diamond or CBN sintering. The metal layers, in turn, are interposed between a pair of compression disks or support layers. The entire assembly is submited to HP/HT sintering for forming a polycrystalline diamond or CBN core having two metal-derived transitional layers adherently bound to and disposed between said core and said outer support layers. In a preferred embodiment, the compression disks comprise cemented carbide substrates which are bound to the transitional layers.

Another aspect of the present invention is the sandwich polycrystalline compact which is manufactured by the foregoing procedure. Such compact comprises a sintered polycrystalline diamond or CBN core having two metal-derived transitional layers in situ adherently bonded thereto. A preferred configuration comprises a polycrystalline diamond or CBN compact core having two metal-derived transitional layers in situ adherently bound thereto, at least one of said metal-derived layers having a cemented carbide substrate in situ adherently bonded thereto. Such sandwich compacts are useful in fabricating diamond tipped twist drills, mining roof bolt drills, and similar products.

Advantages of the present invention include much improved process reliability in the fabrication of polycrystalline sandwich compact blanks. Another advantage is a polycrystalline sandwich compact possessing sufficient thermal stability so that it can be mounted by brazing techniques. Yet another advantage is a sandwich polycrystalline compact having a wide range of final diamond crystallite size. Yet a further advantage is the ability to produce a sandwich polycrystalline compact of controlled polycrystalline core thickness. These and other advantages will be readily apparent to those skilled in the art based upon the disclosure contained herein.

The drawings depict right cylindrical configurations for the novel sandwich polycrystalline compacts, though it will be appreciated that a variety of additional configurations can be fabricated in accordance with the present invention. The drawings will be described in fuller detail below.

DETAILED DESCRIPTION OF THE INVENTION

In conventional systems for sintering diamond or CBN in cemented carbide supported sandwich polycrystalline compacts, a major flow of catalyst infiltrates the diamond or CBN mass from the carbide support. For example, the sandwich compacts proposed in U.S. Pat. No. 4,219,339 employ the cobalt catalyst content of the cemented carbide substrates for effecting diamond recrystallization and formation of the polycrystalline diamond core interleaved between adjacent cemented metal carbide supports. Alternatively, this same patent proposes to braze cemented carbide supports onto the central diamond core. Use of the catalyst content from the adjacent cemented carbide support for effecting diamond sintering and recrystallization does not provide a reliable process for manufacturing polycrystalline sandwich compacts as delamination and stress fracturing at the diamond interface and difficulties in the production of flaw-free fine grain diamond cores are frequent occurrences.

The present invention provides a reliable HP/HT fabrication process for producing a quality sandwich polycrystalline compact product with a favorable process yield. An intermediate or transitional metal-derived layer present in between the mass of abrasive particles and outer support layers plays an important role in obtaining proper interface morphology and stress distribution to eliminate cracking problems during and after the HP/HT process. Such metal-derived layer can be termed a "soft" layer (soft in terms of the adjacent polycrystalline diamond or CBN material and cemented carbide material) which soft or ductile intermediate layer has the ability to balance the residual stresses from the HP/HT sintering of materials with different thermophysical properties. The formation of the ductile layer at the interface enhances its bonding with both cemented carbide and diamond as well as reduces or eliminates the stress concentrators which are believed to be important when the residual stress cracking is considered.

Figure 1:
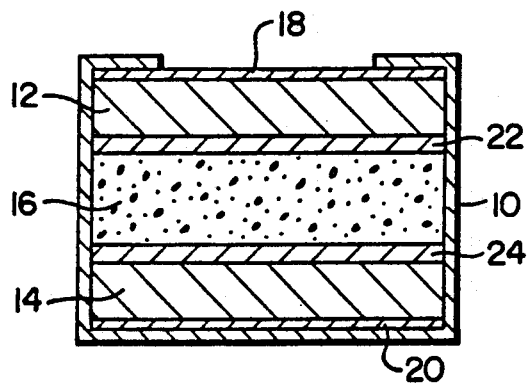
FIGS. 1–3 depict cross-sectional elevational views of three different reaction cell or assembly configuration for producing the novel sandwich polycrystalline compacts of the present invention.

More specifically, FIG. 1 depicts a conventional assembly for making polycrystalline sandwich compacts under HP/HT conditions, but which assembly has been altered in accordance with the precepts of the present invention. The assembly depicted comprises enclosure 10 of a refractory metal such as molybdenum, tantalum, titanium, tungsten, zirconium, etc., in which is contained green or sintered metal carbide layers 12 and 14, and interiorly disposed central core diamond or CBN particles 16. Refractory metal disks 18 and 20 are disposed on the outer surfaces of carbide substrate pieces 12 and 14. Layers 22 and 24 are interposed between crystalline mass 16 and carbide substrate layers 12 and 14. At least one of metal or metal alloy layer 22 and 24 comprises a catalyst for sintering of the crystals forming mass 16, i.e. diamond or CBN particles. Both layers 22 and 24 can comprise catalyst or catalyst alloy material, or one of such layers can comprise catalyst or catalyst alloy material while the other will be a non-catalyst metal or higher melting catalyst. Under these latter conditions, a selective uni-axial diffusion of catalyst, e.g. cobalt from layer 22, would flow through crystalline mass 16 to layer 24, which could be nickel or another metal or metal alloy.

In more general terms, layers 22 and 24 need not be of the same composition though they can be. Each layer independently can be composed of a single metal, a mixture of metals, an alloy, a mixture of a metal and an alloy, a mixture of alloys, a mixture of a metal and a non-metal (e.g. cermet), a mixture of an alloy and a non-metal, and the like. So long as a catalyst or catalyst alloy material is present for diffusion and sintering of the crystals forming mass 16, the choice of composition for layers 22 and 24 can be dictated by other considerations, e.g. final use of the product, cost considerations, raw material availabilities, nature of the metal or alloy forming these layers, composition of the compression disk or supports, nature and/or particle size the crystalline mass 16, and the like. Moreover, the metal or alloy forming layers 22 and 24 may be unreactive or non-reactive with other constituents housed within enclosure 10 under the appropriate HP/HT conditions established, or one or more constituents of layers 22 and 24 can be reactive with other constituents housed within enclosure 10. Thus, with respect to the composition of layers 22 and 24, "metal layers" should be construed broadly in accordance with the precepts of the present invention.

Figure 2:
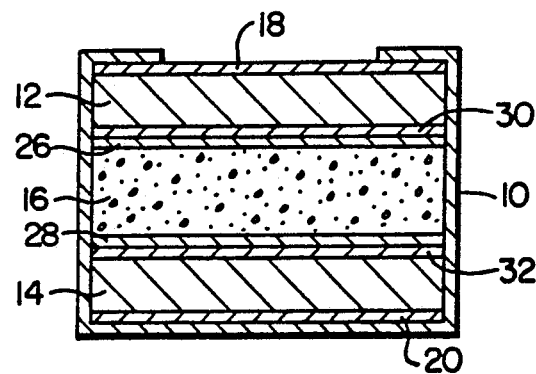

An alternative assembly is set forth at FIG. 2 wherein catalyst layers 26 and 28 adjacent mass 16 have metal layers 30 and 32, respectively, interposed between carbide layers 12 and 14, respectively. Metal layers 30 and 32 can be a metal which alloys with the catalyst for forming a catalyst alloy for diffusion, can be a non-catalyst metal, or can be a refractory metal.

Alternatively, the position of the two layers can be reversed on at least one side of mass 16 with the layer adjacent mass 16 being copper or another low-melting metal for pre-sweeping through mass 16 prior to infiltration of the catalyst, as such is taught in commonly-assigned U.S. Pat. No. 4,518,659.

Figure 3:
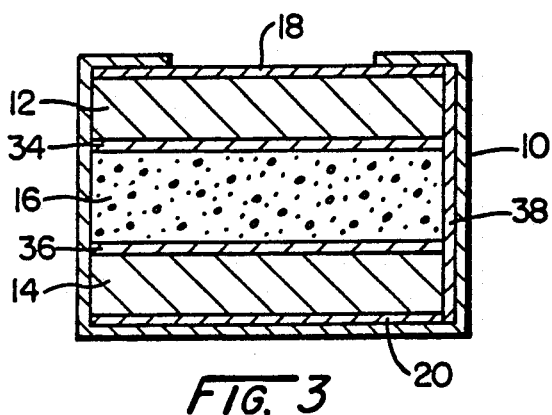

Yet another embodiment of the assembly is depicted at FIG. 3. Layers 34 and 36 interposed between mass 16 and carbide substrates 12 and 14, respectively, will comprise a non-catalyst for sintering of the crystals of mass 16, or will be a catalyst which does not infiltrate under the HP/HT conditions maintained within the assembly. The catalyst is supplied from layer 38 which is placed adjacent at least one side of polycrystalline mass 16. If catalytic material is contained within carbide substrates 12 and 14, or metal layers 34 and 36, then conditions are maintained and compositions are adjusted such that catalytic material from layer 38 directionally and preferentially sweeps through mass 16 for sintering of the crystals thereof, as such directional sweep process is taught in commonly-assigned application Ser. No. 697,669, filed Feb. 4, 1985, now U.S. Pat. No. 4,778,486.

Figure 4:
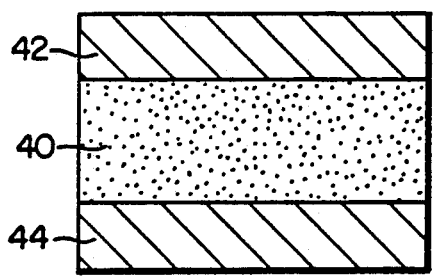
FIGS. 4–6 depict three different embodiments of the novel sandwich polycrystalline compacts in cross-sectional elevational view.

Regardless of the cell or assembly configuration, the final product comprises a sintered core of polycrystalline diamond or CBN having at least two in situ adherently bonded metal-derived layers attached thereto. Such configuration is depicted at FIG. 4 for polycrystalline core 40 and metal-derived layers 42 and 44. When such a configuration is desired, layers 12 and 14 are termed compression disk as they provide a balanced compression on the mass of diamond or CBN during HP/HT sintering to maintain the thickness thereof.

In general terms, layers 42 and 44 of the final sandwich product independently can be comprised of a metal, a mixture of metals, an alloy, a mixture of alloys, a cermet, a mixture of a metal and a cermet, a mixture of an alloy and a cermet, and the like, depending upon the composition of initial metal layers 22 and 24, the composition of compression disks 12 and 14, the composition of the particles comprising mass 16, the HP/HT conditions utilized, and the like. That is, the constituent or constituents forming layers 22 and 24 may be reactive under the conditions maintained during formation of the sandwich compact which can result in the formation of alloys, cermets, etc. So long as such intermediate layers provide the requisite softness or ductility for reducing and/or eliminating stress concentrators during the processing, a variety of compositions can comprise initial layers 22 and 24 and layers 42 and 44 of the final product. The final adherently bound layers, e.g. layers 42 and 44, of the final sandwich product, which layers result from the initial metal layers, e.g. layers 22 and 24, will be termed "metal-derived layers" as they result from layers which initially contain metal and are defined as "metal layers" above.

Figure 5:
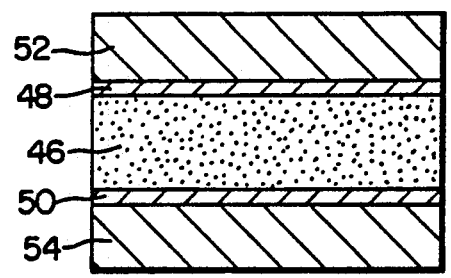
Figure 6:
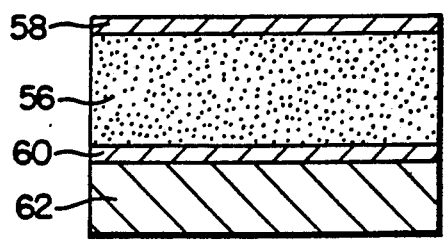

Alternatively, the novel polycrystalline sandwich compact can be configured as in FIG. 5 wherein sintered polycrystalline diamond or CBN core 46 is interposed between metal-derived layers 48 and 50, which, in turn, are interposed and adherently bonded to cemented carbide substrates 52 and 54, respectively. At least one of layers 48 or 50 is rich in catalyst and the other may or may not be. Finally, an alternative embodiment for the novel compact as set forth in FIG. 6 shows that intermediate polycrystalline core layer 56 having metal-derived layers 58 and 60 in situ adherently bonded thereto may have only one of the metal layers, metal-derived layer 60, in situ adherently bonded to carbide substrate 62. Of course, a variety of combinations of configurations as set forth herein can be envisioned based upon the disclosure contained herein.

The crystallite size of the diamond or CBN can range from submicron size on up to 100 microns or greater with size gradient distribution being practiced as is necessary or desirable. When fine crystallite size is being used, e.g. 2-4 microns, a uniaxial or unidirectional catalyst flow is preferred in order to eliminate bridging. The second metal layer desirably is nickel or another metal which can favorably react with impurities driven by the lower melting cobalt or other catalyst diffusion towards the nickel phase, as well as provide good nickel/diamond layer interface bonding.

With respect to the thickness of the initial metal layers and of the final metal-derived layers, sufficient thickness should be maintained throughout the processing procedure for reliable production of the desired sandwich compacts. Factors influencing such metal and metal-derived layers include, for example, the composition of the initial metal layers and possible catalyst depletion therefrom during the HP/HT processing, whether the metal-derived layers will be backed by carbide supports, the precise HP/HT conditions used during the process, and the like. When a configuration like that depicted at FIG. 4 is being made, the maximum thickness of the initial metal layers and final metal-derived layers probably more depends on the ultimate use of the compact which often dictates the thickness required for the outer metal-derived sandwich layer, as well as size restrictions placed on conventional HP/HT reaction cells. Probably more important is the minimum thickness which must be maintained in order to provide the requisite ductility and flexibility to prevent delamination and stress cracking which otherwise would occur at the diamond/carbide interface. This can translate into the metal-derived layers of the final sandwich compact being at least about 0.005 inch in thickness with the maximum thickness for commercial products typically being about 0.5 inch though thicker metal layers certainly can be produced. The initial metal layers can be in the form of powder or disks in the reaction cell. Of course, catalysts, refractory metal, or other material advantageously can be intermixed with the polycrystalline diamond/CBN or coated thereon as is conventional in the art.

Preferred forms of high pressure/high temperature apparatus in which the polycrystalline sandwich compacts of the present invention may be prepared are known in the art, as typified by U.S. Pat. No. 2,941,248 which describes a "belt apparatus." Operational techniques for simultaneously applying both high pressure and high temperature in this type of apparatus also are well known to those skilled in the super pressure art. In practice, a number of assemblies as depicted at FIGS. 1-3 can be combined in a charge assembly and placed in a belt apparatus as described, for example, in U.S. Pat. No. 3,609,818. Thereafter, the pressure and then the temperature are increased and held at the desired conditions for a time sufficient for diamond or CBN sintering to occur. Thereafter, to relieve stresses gradually the sample is allowed to cool under pressure for a short period of time followed by a gradual release of the pressure to atmospheric pressure. The sandwich compact is recovered and any unnecessary shield metal sleeve manually removed. Any adhering metal from the shield metal cup or disk can be ground or lapped off if necessary. Distortion or surface irregularity also may be removed in a similar manner. The following examples show how the present invention can be practiced but should not be construed as limiting. In this application, all citations are expressly incorporated herein by reference.

EXAMPLES

EXAMPLE 1

A variety of cell configurations were tested for determing their efficiency in manufacturing polycrystalline diamond sandwich compacts. Runs 593-598 used a cell design (2 cells per assembly) as in FIG. 1 with Ta disks 18 and 20, WC 12 and 14 (0.075 in × 0.562 in diameter), and Co disks 22 and 24 (0.015 in thick). Runs 623-628 used a cell design (2 cells per assembly) as in FIG. 2 with Ta disks 18 and 20 (0.004" thick), and different metal disks 30 and 32 (0.002 in thick) as detailed below. Diamond 16 comprises 0.5 g of about 55 micron diamond particles.

TABLE 1

| Run No. | Temp. (°C.) | Pressure (kbar) | Metal Layer 30,32 | Comments |
| --- | --- | --- | --- | --- |
| 593 | 1370 | 55 | — | Both compacts good |
| 594 | 1370 | 55 | — | Both compacts good |
| 595 | 1370 | 55 | — | Both compacts good |
| 596 | 1370 | 55 | — | Both compacts good |
| 597 | 1370 | 55 | — | Both compacts good |
| 598 | 1370 | 55 | — | Both compacts good |
| 623 | 1370 | 55 | Nb | Both compacts good |
| 624 | 1370 | 55 | W | 1 good, 1 interface delamination |
| 625 | 1370 | 55 | Cu | Both compacts good |
| 626 | 1370 | 55 | Zr | 1 good, 1 interface delamination |
| 627 | 1370 | 55 | Mo | Both interface delamination |
| 628 | 1370 | 55 | Ta | 1 good, 1 interface delamination |

Several of the sandwich compacts then were subjected to additional testing as follows. Thermostability testing involved heating the samples in an electric tube furnace at 650° +10° C. for 5 minutes in ambient air. The samples were 0.200 inch thick (0.040 inch diamond thickness) and 0.500 inch diameter. Knoop hardness testing of the diamond layer called for one side of the WC to be lapped off and the Knoop hardness number determied at three locations (center, half-way to the edge, and at the edge) using a Wilson Tukon Knoop Hardness Tester (3 kg load). Abrasion resistance testing used 0.115 in thick (0.0400 inch diamond thickness) and 0.500 inch diameter samples under the following conditions:

Barre-granite specimen, 600 SFPM work speed, 0.040 inch cut depth, 0.011 inch per revolution transverse rate, and 1 minute cutting time. Two tests per sample were run and the abrasion resistance factor (ARF) determined. ARF is the volume of the compact removed in cubic inches. The wear load is measured and the volume calculated from this measurement.

TABLE 2

| Sample No. | Thermostability Test | Knoop Hardness No. | ARF |
|---|---|---|---|
| 593 | — | 3575 | 34.4 |
|  |  | 3460 | 18.4 |
|  |  | 3540 |  |
| 593H | No sign of thermal damage | 3400 | 34.3 |
|  |  | 3520 | 37.1 |
|  |  | 3250 |  |
| 597 | — | — | 39.2 |
|  |  |  | 18.4 |
| 598 | — | — | 28.9 |
|  |  |  | 20.4 |
| 623 | — | — | — |
| 624 | — | — | 27.5 |
|  |  |  | 24.2 |
| 625 | — | — | — |
| 625H | No sign of thermal damage | 3350 | 30.6 |
|  |  | 3000 | 35.6 |
|  |  | 3140 |  |
| 626 | — | — | — |
| 628 | — | — | — |

The above-tabulated results demonstrate the ability of the process to make sandwich compacts. These results also demonstrate that the sandwich compacts posses commercially acceptable performance. Present commercially supported polycrystalline diamond cutting blanks have been tested with the same tests and found to have Knoop Hardness Numbers of about 3200–3800 and ARF values of about 20–30, typically.

EXAMPLE 2

All configurations (5 cells per assembly) as in FIG. 1 were tested using Ta disks 18 and 20 (0.004 inch thick), WC 12 and 14 (0.040 inch thick), Co disk 22 (0.030 inch thick), Ni disk 24 (0.030 inch thick), and 0.35 g of diamond 16 (2–4 microns particle size). Disk diameters were all about 0.562 inches. The following results on the as-pressed sandwich compacts was recorded.

TABLE 3

| Run No. | Temp. (°C.) | Pressure (kBar) | Run Time (min.) | Comments |
|---|---|---|---|---|
| 1012 | 1390 | 60 | 15 | All 6 good samples |
| 1015 | 1390 | 60 | 15 | 3 good samples |
| 1016 | 1360 | 60 | 15 | 4 good samples |
| 1017 | 1330 | 60 | 15 | 1 good sample |
| 1019 | 1380 | 60 | 7 | 4 good samples |

Initially, it should be remembered that the very fine diamond feed particle size is quite difficult to convert into a sintered polycrystalline compact, even in conventional cylindrical and wire die configurations, as those in the art are well aware. Next, it does appear that a minimum or threshold temperature is needed to achieve sandwich compact integrity based on the results of Run 1017 in particular. Finally, it should be understood that no optimization study on the process has been undertaken and the above-tabulated results represent initial test data which demonstrate the invention.

I claim:

1. A method for manufacturing a polycrystalline sandwich compact comprising a polycrystalline diamond or CBN core interposed between outer support layers, which comprises:
   (a) providing an assembly comprising a mass of diamond or CBN particles; a pair of compression disks; two metal layers, one each of which is interposed between said mass and each of said compression disks; and when said mass comprises diamond particles, a source of sintering aid/catalyst for diamond sintering;
   (b) subjecting said assembly to HP/HT sintering for forming a sintered polycrystalline diamond or CBN core having two metal-derived support layers adherently bound thereto.

2. The method of claim 1 wherein when said mass comprises CBN particles, a source of sintering aid/catalyst for CBN sintering is provided.

3. The method of claim 1 wherein both said metal layers also include a source of sintering aid/catalyst for diamond sintering.

4. The method of claim 2 wherein each of said metal layers also includes a source of sintering aid/catalyst for CBN sintering.

5. The method of claim 1 wherein only one of said metal layers includes a source of sintering aid/catalyst for diamond sintering.

6. The method of claim 2 wherein only one of said metal layers includes a source of sintering aid/catalyst for CBN sintering.

7. The method of claim 1 wherein said metal of said metal layers is selected from the group consisting of molybdenum, tantalum, tungsten, zirconium, titanium, copper, niobium, alloys thereof, and mixtures thereof.

8. The method of claim 1 wherein each of said compression disks comprises cemented carbide.

9. The method of claim 8 wherein said cemented carbide is selected from the group consisting of tungsten carbide, titanium carbide, tantalum carbide, and mixtures thereof;
   cemented with a bonding medium selected from the group consisting of cobalt, nickel, iron, chromium, and mixtures thereof.

10. The method of claim 1 wherein said diamond sintering aid/catalyst is selected from the group consisting of cobalt, nickel, iron, ruthenium, rhodium, palladium, platinum, chromium, manganese, tantalum, osmium, irridium, mixtures and alloys thereof.

11. The method of claim 2 wherein said CBN sintering aid/catalyst is selected from the group consisting of a Group VIII metal, chromium, tantalum, manganese, aluminum, and aluminum alloyed with a metal selected from the group consisting of nickel, cobalt, manganese, iron, vanadium, and chromium; and mixtures thereof.

12. The method of claim 1 wherein said source of sintering aid/catalyst adjacent to said mass is not interposed between said mass and said compression disk, for infiltrating through said mass during sintering.

13. The method of claim 1 wherein said HP/HT conditions comprise a temperature of between about 1200° and 1500° C. and a pressure in excess of about 50 Kbar.

* * * * *